United States Patent
Cochran et al.

(10) Patent No.: US 7,164,907 B2
(45) Date of Patent: Jan. 16, 2007

(54) AUTOMATED OVER THE AIR PLUG-IN DEVICE RECOGNITION AND SOFTWARE DRIVER DOWNLOAD

(75) Inventors: Stephen Cochran, San Diego, CA (US); Scott Dickson, Carlsbad, CA (US)

(73) Assignee: Qualcomm Inc., San Diego, CA (US)

( * ) Notice: Subject to any disclaimer, the term of this patent is extended or adjusted under 35 U.S.C. 154(b) by 400 days.

(21) Appl. No.: 10/756,964

(22) Filed: Jan. 13, 2004

(65) Prior Publication Data

US 2005/0154787 A1    Jul. 14, 2005

(51) Int. Cl.
*H04M 3/00* (2006.01)

(52) U.S. Cl. ............... 455/419; 455/418; 455/557; 455/517

(58) Field of Classification Search ........ 455/419, 455/418, 41.1, 41.2, 41.3, 556.2, 557, 517; 709/219; 717/178

See application file for complete search history.

(56) References Cited

U.S. PATENT DOCUMENTS

| 6,982,962 | B1 * | 1/2006 | Lunsford et al. | 370/278 |
| 7,016,875 | B1 * | 3/2006 | Steele et al. | 705/44 |
| 2003/0143991 | A1 * | 7/2003 | Minear et al. | 455/419 |
| 2004/0088180 | A1 * | 5/2004 | Akins | 705/1 |

* cited by examiner

*Primary Examiner*—Melur Ramakrishnaiah
(74) *Attorney, Agent, or Firm*—Philip R. Wadsworth; Robert J. O'Connell

(57) ABSTRACT

A system and method for automatically detecting a peripheral device in communication with a wireless device, such as a wireless telephone, and requesting a driver for the peripheral from a remote server via a wireless communications network. After the driver is received and installed, the wireless device checks automatically for availability of a new version of the driver from the remote server. If there is a new version, the new driver will be downloaded to the wireless handheld device.

58 Claims, 5 Drawing Sheets

AUTOMATED OVER THE AIR PLUG-IN DEVICE RECOGNITION AND SOFTWARE DRIVER DOWNLOAD

BACKGROUND

1. Field

The present invention generally relates to wireless telecommunications, and more specifically, relates to a system and method for enabling automatic over the air downloading of driver for a peripheral device communicating with a wireless device.

2. Description of the Related Art

Technology advancement has made mobile telephones or wireless communications devices cheap and affordable to almost everyone. As the wireless telephones are manufactured with greater processing ability and storage, they also become more versatile. Now different peripheral accessories can be connected to a wireless telephone, and thus, new functionalities can be provided through the wireless telephone. Some accessories simply use the communication ability of the wireless telephone to communicate data across the phone network. In such instance, the wireless telephone is simply used as a modem.

Other computer devices provide some functionality to the wireless telephone. For example, a user may be able to plug in an external camera, from which photographic images can be downloaded into the wireless telephone and transmitted to a destination party. Alternatively, a user may want to plug in an external memory storage device into a wireless telephone equipped with a camera to save photographs taken by the camera.

One problem with a wireless telephone is that they possess a limited memory capacity and can not save many photographs that have significant storage requirements. Therefore, the user may temporarily plug the external memory storage device into the wireless telephone and transfer the photographic images from the wireless telephone into the external memory storage device.

Currently, most of these external devices are developed by either wireless telephone manufacturers or a party authorized by the manufacturers and the drivers for these external devices are pre-loaded in the wireless devices. Because of limited storage capacity of these wireless devices, it becomes difficult to load a great number of drivers to support external peripheral devices manufactured by different manufacturers. This limits the selection of external peripheral devices available to users of wireless/mobile devices. In addition, more varieties of external peripheral devices will likely become available after the wireless device has been manufactured. Some means for providing drivers and applications software for those additional external peripheral devices will be required. Packaging a driver and applications software with the external peripheral device, as is generally done for personal computers, is not generally desirable or even possible for wireless devices.

SUMMARY OF THE INVENTION

The invention is a system and method that allow a wireless device to support a plurality of peripheral devices from different manufacturers. In one embodiment the invention is a method for automatically detecting a peripheral device added to or installed in a wireless device and downloading a proper driver from a remote server through a wireless communications network. The wireless device first determines if a peripheral device is communicating with the wireless device, and, if the peripheral device is communicating, the wireless device retrieves the peripheral device's information, sends the peripheral device's information to the remote server via a wireless communications network, and receives a driver for the peripheral device from the remote server via the wireless communications network.

The method for automatically downloading a driver through a wireless communications network to a wireless device with a peripheral device uses a sequence of messages between the wireless device and a server. A remote server receives identification information from the wireless device through a wireless communications network, retrieves a driver from a database based on the identification information received, and transmits the driver to the wireless device via the wireless communications network. Alternatively, the method is for automatically requesting a new driver for a peripheral device in a wireless device and downloading the driver through a wireless communications network. The wireless device retrieves the driver's information, sends the driver's information to a remote server via a wireless communications network, and receives a new driver for the peripheral device from the remote server via the wireless communications network.

Further, the method can be used for automatically downloading a new driver for a peripheral device in a wireless device through a wireless communications network. A remote server receives driver identifying information via a wireless communications network, compares the received driver information with driver information in a database. If the driver information in the database is newer than the received driver information, then the server retrieves the new driver from the database for the peripheral device and transmits the driver from the database to the wireless peripheral device via the wireless communications network.

The system includes an apparatus for receiving a peripheral device, detecting the peripheral device, and downloading a driver for the peripheral device through a wireless communications network. The apparatus includes an external interface, a controller capable of detecting a peripheral device in communication with the external interface, a transceiver for transmitting the peripheral device information to a remote server via the wireless communications network, and a storage unit for storing the driver received from the remote server, wherein the driver is used for the controller to communicate with the peripheral device. The controller is capable of retrieving peripheral device information, and the transceiver is capable of receiving a driver from the remote server.

Other advantages, and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "hand held telephone," "wireless communications device," "wireless handset," "handheld device," and "handset" are used interchangeably, the term "application" as used herein is intended to encompass executable and non-executable software files, raw data, aggregated data, patches, and other code segments. Further, like numerals refer to like elements throughout the several views. As technology progresses, different products and gadgets have been developed to improve and enhance our lives. For example, wireless telephones allow us to be in communication with our love ones instantly even we are out of home or away from office. Personal digital assistants (PDAs) allow us to check and make appointments, access friends' contact information, or even track our expenses anywhere; portable gaming devices entertain us everywhere we go.

Interestingly, the advancement in technology also triggers a convergence of products. Now, a user may be able to place a wireless telephone call and record an appointment on his combined wireless telephone PDA; he can also enjoy a video game on his combined device. It is also possible for the user to plug or access new components that provide extra capabilities into his wireless telephone. For example, the user can plug in a camera into the wireless telephone and send pictures from the camera to friends via wireless transmission. The user may also be able to plug a video game device or a play pad into this wireless telephone and use the wireless network to download software that supports the added peripheral devices, including device drivers and new games that make use of the added peripheral devices.

The wireless device herein supports plug-in devices produced by different manufacturers, because the wireless device does not need to be preloaded with drivers for all possible peripheral devices. The wireless device is capable of detecting new peripheral devices, retrieving identification from these devices, and downloading, via wireless transmission, corresponding drivers for these devices from a remote server. After a new peripheral device is identified and the corresponding driver installed, the wireless device may display a menu of available applications for the user to select. The invention also makes it possible for the wireless device to automatically download a new device driver when a new device driver becomes available.

Figure 1:
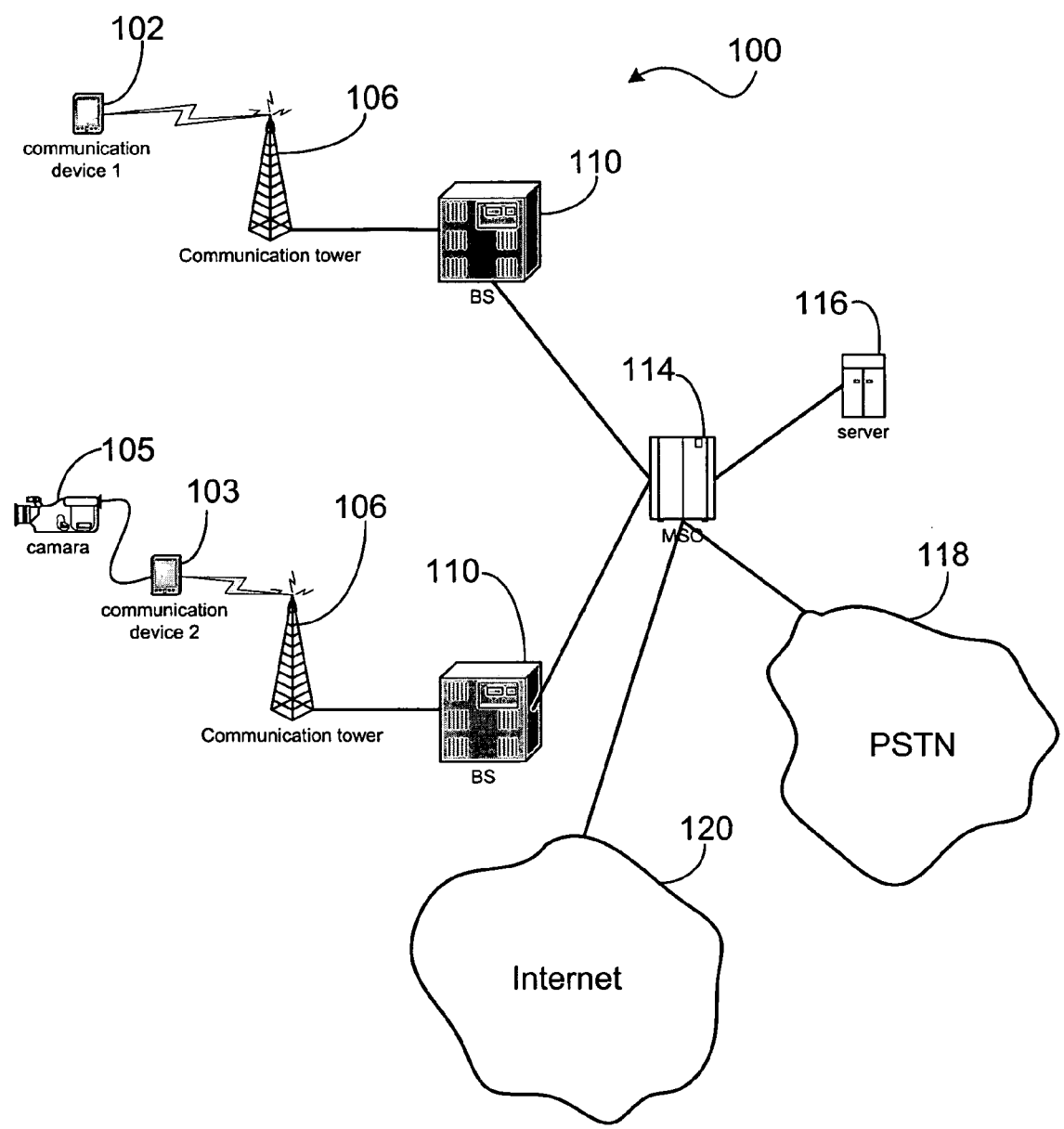
FIG. 1 is an architecture that supports automated peripheral device recognition and driver download system.

FIG. 1 depicts a communication network 100 used according to the present invention. The communication network 100 includes one or more communication towers 106, each connected to a base station (BS) 110 and serving users with wireless devices 102, 103. The wireless devices 102, 103 can be cellular telephones, pagers, personal digital assistants (PDAs), laptop computers, or other hand-held, stationary, or portable communication devices that use a wireless and cellular telecommunication network. The commands and data input by each user are transmitted as digital data to a communication tower 106. The communication between a user using a wireless device 102 and the communication tower 106 can be based on different technologies, such code division multiple access (CDMA), time division multiple access (TDMA), frequency division multiple access (FDMA), the global system for mobile communications (GSM), orthogonal frequency division multiplexing (OFDM) or other protocols that may be used in a wireless communications network or a data communications network. The data from each user is sent from the communication tower 106 to a base station (BS) 110, and forwarded to a mobile switching center (MSC) 114, which may be connected to a public switched telephone network (PSTN) 118 and the Internet 120. The MSC 114 may be connected to a server 116 that supports different applications available to subscribers using the wireless communications devices 102. Optionally, the server 116 may be part of the MSC 114.

The wireless device 103 may also have an external camera 105 or other plug-in wireless peripheral devices connected to it. The wireless device 103 communicates with the camera 105 via a driver that is downloaded from the server 116. A user may use the wireless device 103 equipped with application software downloaded from the server 116 to control the camera 105.

Figure 2:
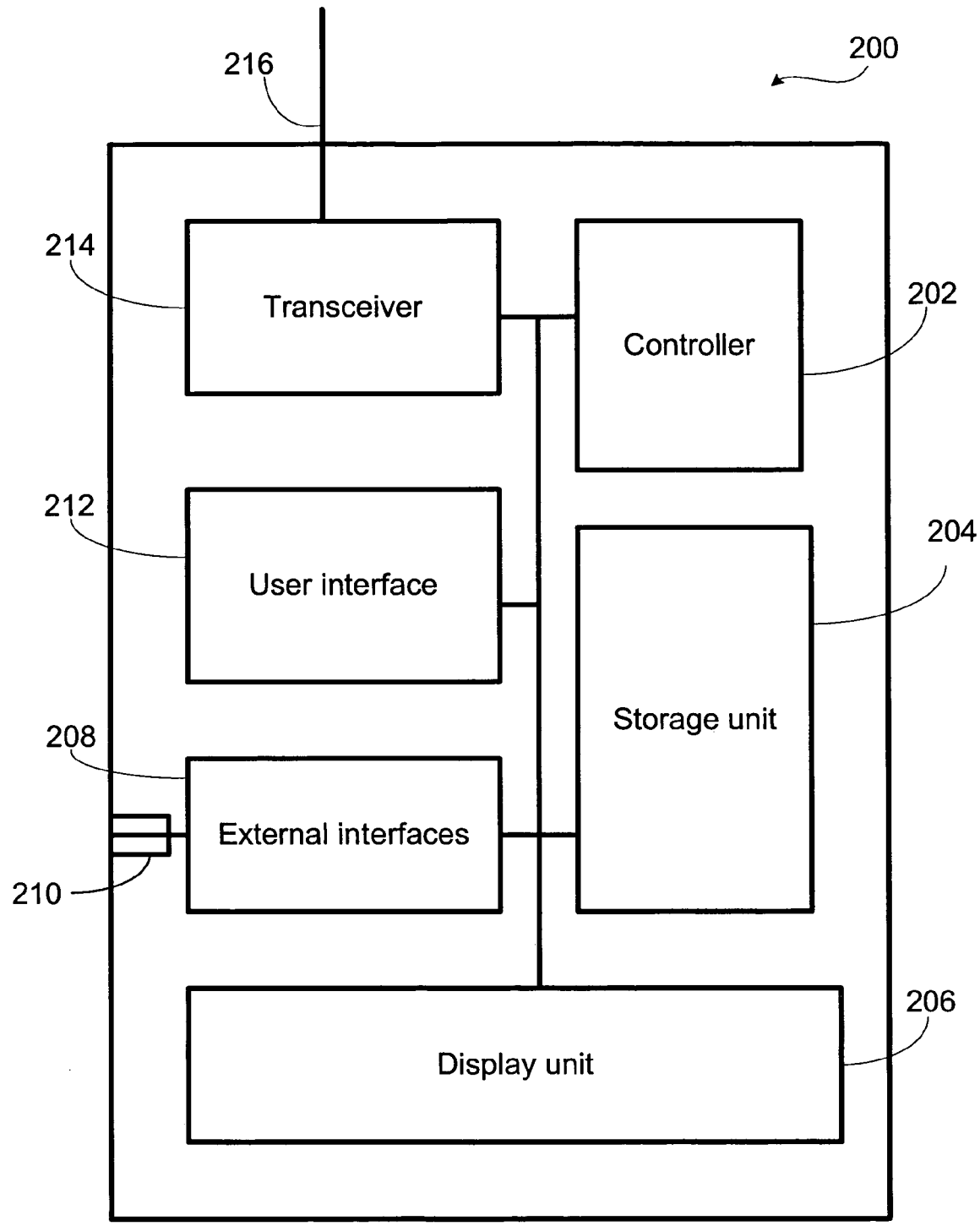
FIG. 2 illustrates a block diagram of a wireless device according to the invention.

FIG. 2 illustrates a block diagram 200 of a wireless device according to the invention. The wireless device 103 has a transceiver 214 connected to an antenna 216, a controller 202, a memory storage unit 204, a display unit 206, external communication interface 208 connected to one or more physical plug in slots 210, and a user interface 212. The transceiver 214 receives and transmits radio transmissions to and from the communications tower 106. The user interface 212 controls interface with user through a keypad, microphone, speaker, and display unit 206. The storage unit 204 generally consists of a non volatile memory that stores system data, application data, and user data. The downloaded applications and drivers are stored in the storage unit 204. The display unit 206 displays system information to the user and also serves as a visual interface medium for the applications that run on the wireless device. The controller 202 is responsible for controlling all operations of the wireless device. The controller 202 may invoke different applications and software routines to accomplish different tasks and functions provided by the wireless device such as ones described below. The plug in slot 210 may be compatible with industry standards such as the Universal Serial Bus (USB) standard, PC Card, Compact Flash or Secure Digital.

Figure 3:
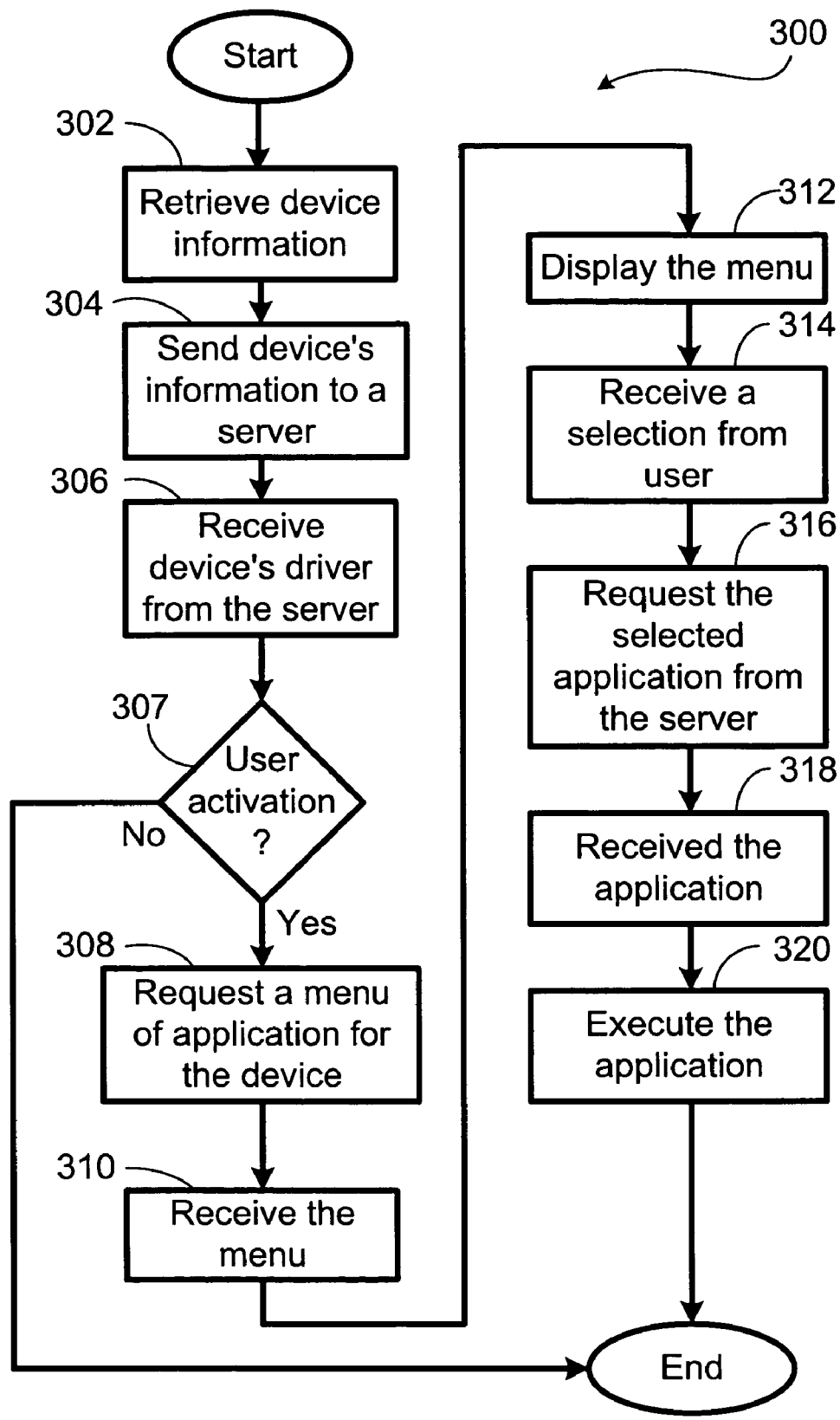
FIG. 3 is a flow chart for a wireless device.

FIG. 3 is a flow chart 300 for a new peripheral device detection and driver download process. When the wireless device 103 is powered up or detects insertion or connection of a new plug-in device, it goes through a self diagnostic process and checks for any new peripheral device that may be connected to it. The wireless device 103 checks whether there is a new peripheral device connected to one of plug-in slots 210. If a new peripheral device is detected, the controller 202 retrieves the peripheral device information from the new device, step 302. The controller 202 may retrieve the peripheral device information by accessing a predefined memory location assigned to the plug-in slot 210 or by accessing directly the input/output port location associated with the plug-in slot 210. The peripheral device information retrieved may contain information on the device type, device manufacturer, device model, and other device pertinent information.

After retrieving the peripheral device information from the plug-in device, the wireless device 103 sends this information to a remotely located server 116, step 304. The information is sent through the transceiver 214 via radio signal to the remote server 116. The server 116, which may be owned by the wireless service provider or a third party, receives the peripheral device information, retrieves a proper driver for the peripheral device from a database, and transmits the driver to the wireless device 103. The wireless device 103 receives the driver, step 306, and installs the driver. The driver is generally stored in the storage unit 204.

After the driver is installed on the wireless device 103, the wireless device 103 can communicate properly with the plug-in device.

After the driver is installed, the wireless device 103 checks whether the user has activated the newly installed plug-in peripheral device, step 307. If the user has activated the peripheral device, the wireless device 103 sends a request to the server for a menu of available applications, step 308. If the plug-in peripheral device is a video gaming device, there may be a plurality of games for the user to choose from. The server 116 may request that the user be a subscriber and require the user's identity and a password or other authentication data to be authenticated before the menu is downloaded to the wireless device 103. After authenticating the user's identity or other authentication data and the password against a subscriber database, if appropriate, the wireless device 103 receives a menu of applications from the server 116, step 310, and displays the menu to the user, step 312. Alternatively, the application menu may be downloaded to the wireless device along with the driver and refreshed periodically.

The user may select an application from the menu by inputting his selection through the user interface 212 and the selection is received by the wireless device 103, step 314. The wireless device 103 sends a request for the selected application to the server 116, step 316. When the requested application is received by the wireless device 103, step 318, the application may be stored in storage unit 204 for repeated execution The wireless device 103 executes the application, step 320. The application may be displayed on the display unit 206 and the user may enter his input through the user interface 212.

Alternatively, after detecting the presence of a new peripheral device, the wireless device 103 may prompt the user for a password before proceeding to request and install the required driver. The use of the password may prevent an unauthorized user to use the wireless device 103 for some purposes not intended by the wireless device's owner. If the password is not verified, the wireless device will not install the driver.

Figure 4:
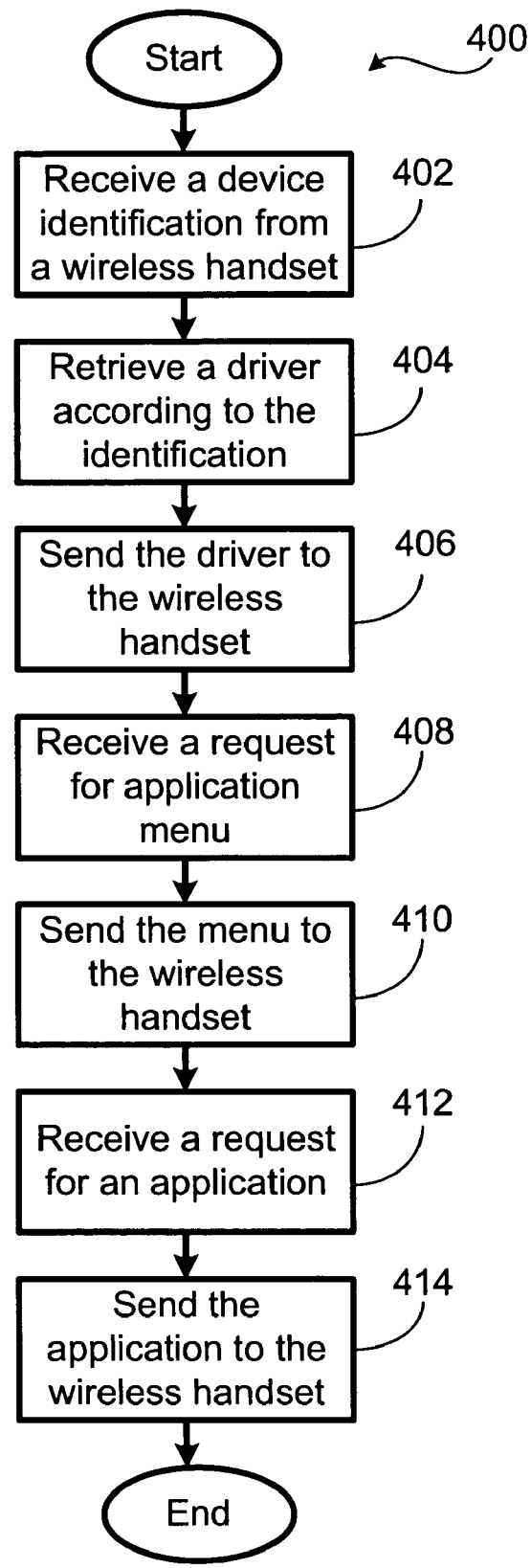
FIG. 4 is a flow chart for a server process communicating with the wireless device.

FIG. 4 illustrates a flow chart 400 for a server process. The server 116 receives a data message with device identification from a wireless device 103, step 402, and retrieves a driver for the specified peripheral device from a storage database, step 404. At some time after sending the driver to the wireless device 103, step 406, the server 116 may receive a request for an application menu from the wireless device 103, step 408. The server 116 assembles a menu listing all the applications available for the device identified in the menu request and sends the menu to the wireless device, step 410. Finally, the server 116 receives a request for a specific application, step 412, from the wireless device 103, retrieves the application from the storage database, and sends the application to the wireless device 103, step 414.

Figure 5:
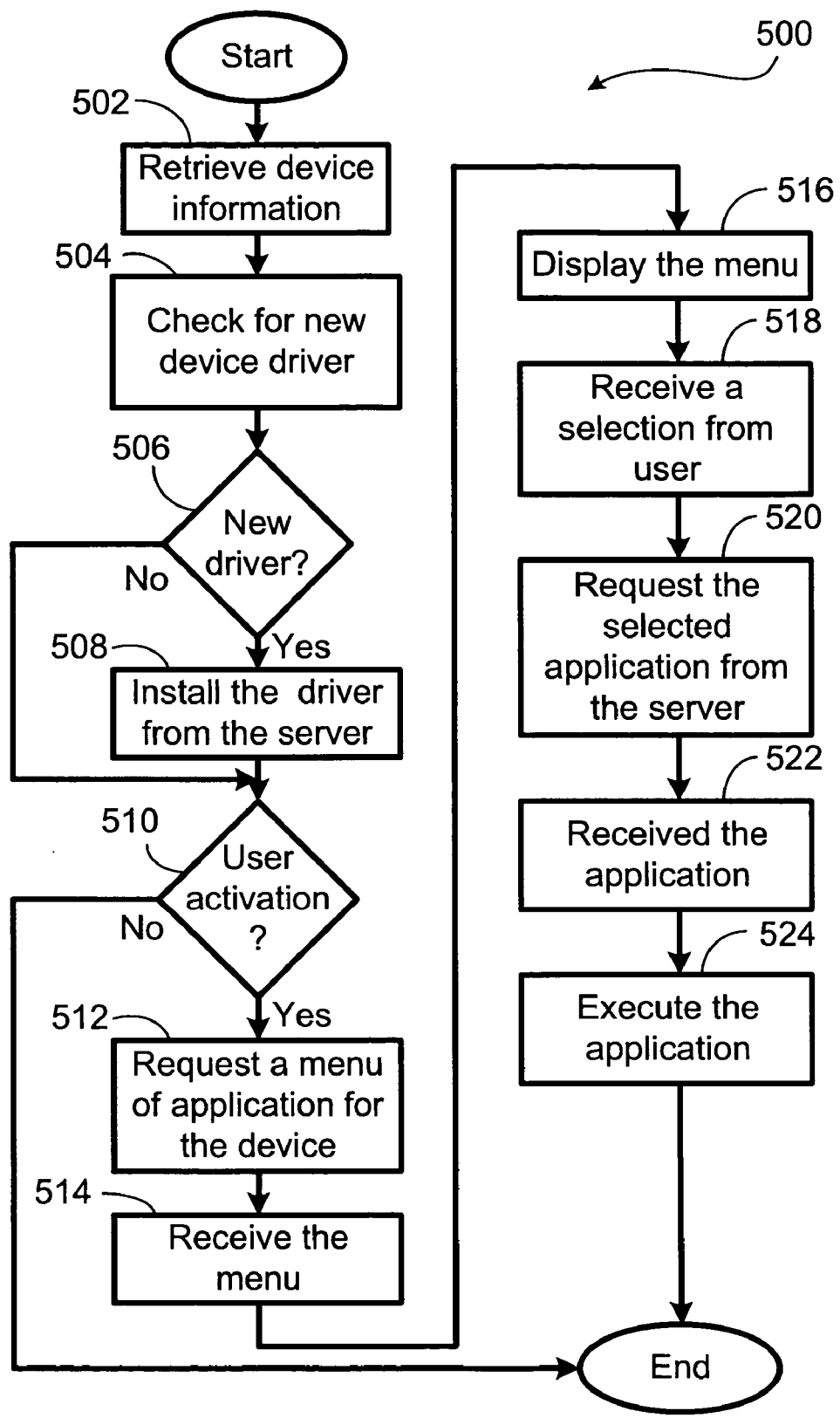
FIG. 5 is a flow chart for updating a peripheral device driver resident on the wireless device.

FIG. 5 illustrates a process 500 for updating device driver. A wireless device may update device drivers by checking the remote server whether there is newer version of drivers available for download. The wireless device may perform the checking periodically or every time it is powered up. Upon powering up or at a predefined time, the wireless device 103 retrieves the information on the plug-in devices, step 502, including the driver information. The wireless device 103 proceeds to send the driver and device information to the server 116 for checking whether there is a new driver for the device, step 504. The server 116 compares the driver information received against the driver it has in its database. If the driver in the database is of newer version, step 506, the server 116 sends the new driver to the wireless device 103, and the wireless device installs the driver, step 508. After the new driver is installed, the wireless device checks whether the user has activated the peripheral device in a manner similar to what has been described above for FIG. 3. Alternatively, the wireless device 103 may prompt the user for a password and/or approval before downloading the new driver for the attached peripheral device.

The following is a description of one use scenario according to one embodiment of the present invention. A user may purchase a wireless device having a device resident operating system, such as a Binary Runtime Environment for Wireless (BREW™) enabled device, and subscribe to a wireless communications service with a provider. The provider may also offer an application service to its subscribers and the applications may include video games and other utility applications. These applications may run on the wireless device itself or on devices that may be plugged into the wireless device. These applications may be BREW™ certified and developed by third party software developers.

The wireless device is capable of receiving plug-in peripheral devices. The plug-in peripheral devices may be inserted into a dedicated plug-in slot or a built-in connector that may include power and functional contacts. For example, the user may plug a camera into the wireless device and transform his ordinary device into a wirelessly networked camera that can send pictures to a remote recipient.

The user plugs in the camera and powers up the wireless device. The wireless device, upon power up, detects a new peripheral device in its plug in port, and retrieves the device information from the camera. Alternatively, the camera may also be plugged into the wireless device after it is powered up, and the wireless device will detect a peripheral device has been inserted into its plug-in slot. The wireless device sends the device information to the server through a wireless communications network. The server receives the device information, retrieves a device driver for the camera, and sends the device driver to the wireless device.

After receiving and installing the device driver, the wireless device proceeds to request a list of available applications for the camera. The request is sent to the server, and the server assembles a list of available applications and sends the list back to the wireless device. The wireless device displays the list to the user. If the user selects a photo editing application, the wireless device makes a request for the selected application to be downloaded to the wireless device. After receiving the application, the wireless device activates it and displays it to the user. The user may use the photo editing application to edit photos taken by the camera before sending the edited photos to a friend via a wireless communications network.

In an alternative embodiment, the peripheral devices may communicate with the wireless device 103 via radio signals or infra-red signals. The wireless device 103 may be equipped with infra-red signal emitter and receiver, and the peripheral device does not need to be physically connected to the wireless device 103. The peripheral device may also be equipped with a radio transceiver for communication with the wireless device 103. The wireless device 103 would communicate with the peripheral device in a radio frequency, such as specified by the Bluetooth standard, distinct from the radio frequency it uses to communicate with the wireless network.

In view of the method being executable on a wireless service provider's computer device or a wireless communications device, the present invention includes a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 3–5, the method may be implemented, for example, by operating portion(s) of the wireless network or a wireless device to execute a sequence of computer programs or machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A method for automatically detecting and operating a peripheral device within a wireless computer device selectively communicating across a wireless communications network with a remote server, comprising the steps of:
   determining if a peripheral device is in communication with the wireless computer device; and
   if the peripheral device is communicating with the wireless computer device,
      retrieving peripheral device information from the peripheral device,
      sending the peripheral device information to the remote server via the wireless communications network,
      receiving a driver for the peripheral device from the remote sewer via the wireless communications network; and
      receiving, based on the sent peripheral device information, at least one of an application menu and an application from the remote server via the wireless communications network, wherein the application menu comprises an indication of an available application corresponding to the peripheral device information, and wherein the application corresponds to the peripheral device information.

2. The method of claim 1, further comprising the steps of:
   requesting the application menu from the remote server via the wireless communications network;
   receiving the application menu from the remote server; and
   displaying the application menu to a user of the wireless computer device.

3. The method of claim 1, further comprising the steps of:
   requesting the application from the remote server;
   receiving the application from the remote server; and
   activating the application.

4. The method of claim 1, further comprising the steps of:
   requesting a password from a user of the wireless computer device prior to sending the peripheral device information to the remote sewer; and
   verifying in the password as a precondition to initiating the sending of the peripheral device information to the remote server.

5. The method of claim 1, wherein the step of retrieving peripheral device information from the peripheral device further comprises the step of receiving the information through wireless communication.

6. The method of claim 5, wherein the wireless communication comprises communication through radio signals.

7. The method of claim 5, wherein the wireless communication comprises communication through infra-red signals.

8. The method of claim 1, further comprising determining if the peripheral device is activated on the wireless communication device, and requesting the application menu if the peripheral device is activated.

9. The method of claim 1, farther comprising receiving the driver together with the application menu based on the sent peripheral device information.

10. A method for automatically downloading a driver for a peripheral device through a wireless communications network to a wireless device having wireless communication ability, comprising the steps of:
    receiving identification information from the wireless device through a wireless communications network, wherein the identification information corresponds to a peripheral device in communication with the wireless device;
    retrieving a driver from a database based on the identification information received;
    transmitting the driver to the wireless device via the wireless communications network; and
    transmitting, based on the sent peripheral device information, at least one of an application menu and an application to the wireless device via the wireless communications network, wherein the application menu comprises an indication of an available application corresponding to the identification information, and wherein the application corresponds to the identification information.

11. The method of claim 10, further comprising the steps of:
    receiving an application menu request from the wireless device;
    compiling the application menu based on the identification information and the application menu request; and
    transmitting the application menu to the wireless device.

12. The method of claim 10, further comprising the steps of:
    receiving an application request from the wireless device;
    retrieving the application from the database and the application request; and
    transmitting the application to the wireless device.

13. The method of claim 10, further comprising the steps of:
    receiving a password from the wireless device prior to the transmitting of at least one of the application menu and the application to the wireless device; and verifying the password as a precondition to initiating the transmitting of at least one of the application menu and the application to the wireless device.

14. The method of claim 10, further comprising the steps of:
receiving a subscriber information from the wireless device prior to the transmitting of at least one of the application menu and the application to the wireless device; and
verifying the subscriber information against a subscriber database as a precondition to initiating the transmitting of at least one of the application menu and the application to the wireless device.

15. The method of claim 10, wherein transmitting of the application menu occurs based on a application menu request received from the wireless device, wherein the application menu request is based on an activated peripheral device.

16. The method of claim 10, further comprising automatically transmitting the driver together with the application menu based on the sent identification information.

17. A method for automatically requesting a device driver for a peripheral device in communication with a wireless computer device, comprising the steps of:
retrieving driver information for the peripheral device;
sending the driver information to a remote server via a wireless communications network; and
downloading a driver for the peripheral device from the remote server via the wireless communications network; and
receiving, based on the sent driver information, at least one of an application menu and an application from the remote server via the wireless communications network, wherein the
application menu comprises an indication of an available application corresponding to the driver information, and wherein the application corresponds to the driver information.

18. The method of claim 17, further comprising the step of prompting a user for approval to download the driver.

19. The method of claim 17, further comprising the steps of:
requesting a password from a user of the wireless computer device prior to the downloading of the driver; and
verifying the password as a precondition to the downloading of the driver.

20. The method of claim 17, wherein the step of retrieving the driver information from the peripheral device further comprises the step of receiving the information through infra-red signals.

21. The method of claim 17, wherein the step of retrieving the information from the peripheral device further comprises the step of receiving the information through radio signals.

22. The method of claim 17, further comprising determining if the peripheral device is activated on the wireless computer device, and requesting the application menu if the peripheral device is activated.

23. The method of claim 17, further comprising receiving the driver together with the application menu based on the sent driver information.

24. An apparatus, comprising:
an external communication interface;
a controller capable of detecting a peripheral device attempting communication through the external communication interface, the controller being capable of retrieving peripheral device information from the peripheral device;
a transceiver for transmitting the peripheral device information to a remote server via a wireless communications network, the transceiver being capable of receiving a driver for the peripheral device from the remote sewer, and the transceiver further capable of receiving at least one of an application menu and an application based on the transmitted peripheral device information, wherein the application menu comprises an indication of an available application corresponding to the peripheral device information, and wherein the application corresponds to the peripheral device information; and
a storage unit for storing the driver received from the remote server;
wherein the driver received from the remote server is used for the controller to communicate with the peripheral device.

25. The apparatus of claim 24, further comprising:
a user interface for receiving user inputs; and
a display unit for displaying information to a user of the apparatus.

26. The apparatus of claim 24, further comprising a plug in slot capable of receiving the peripheral device in communication with the external communication interface.

27. The apparatus of claim 26, wherein the peripheral device comprises a USB capable device.

28. The apparatus of claim 26, wherein the peripheral device comprises a Compact Flash (CF) capable device.

29. The apparatus of claim 26, wherein the peripheral device comprises a PC Card capable device.

30. The apparatus of claim 26, wherein the peripheral device comprises a Secure Digital capable device.

31. The apparatus of claim 24, wherein the controller further is capable of retrieving driver information corresponding to the peripheral device from the peripheral device and directing the transceiver to transmit the driver information to the remote server.

32. The apparatus of claim 24, wherein the external communication interface further being capable of communicating with a peripheral device not physically attached to the apparatus.

33. The apparatus of claim 32, wherein the external communication interface communicates with the peripheral device through infra-red signals.

34. The apparatus of claim 32, wherein the external communication interface communicates with the peripheral device through radio signals.

35. The method of claim 24, wherein the controller is further capable of determining if the peripheral device is activated on the wireless computer device, and initiating an application menu request for the application menu if the peripheral device is activated.

36. The method of claim 24, wherein the transceiver is further capable of receiving the driver together with the application menu based on the sent device information.

37. A computer readable medium on which is stored a computer program for automatically detecting and operating a peripheral device in a wireless device having wireless communication capability, the computer program comprising instructions which, when executed by a computer, perform the steps of:
determining if a peripheral is in communication with the wireless device; and
if the peripheral device is in communication with the wireless device, retrieving peripheral device information from the peripheral device, sending the peripheral device information to the remote server via the wireless communications network, receiving a driver for the peripheral device from the remote sewer via the wireless communications network; and receiving, based on the sent peripheral device information, at least one of an application menu and an application from the remote server via the wireless communications network, wherein the application menu comprises an indication of an available application corresponding to the peripheral device information, and wherein the application corresponds to the peripheral device information.

38. The computer program of claim 37, further performing the steps of:

requesting the application menu from the remote server via the wireless communications network;

receiving the application menu from the remote server; and displaying the application menu to a user.

39. The computer program of claim 37, further performing the steps of:

requesting the application from the remote server;

receiving the application from the remote server; and activating the application.

40. The computer program of claim 37, further performing the steps of:

requesting a password from a user of the wireless computer device prior to sending the peripheral device information to the remote server; and verifying the password as a precondition to initiating the sending of the peripheral device information to the remote server.

41. The computer program of claim 37, wherein the step of retrieving the information from the peripheral device further comprises the step of receiving the information through wireless communications.

42. The computer program of claim 37, wherein the step of retrieving the information from the peripheral device further comprises the step of receiving the information through wired communications.

43. A computer readable medium on which is stored a computer program for automatically detecting and operating a peripheral device at a wireless device having wireless communication capability, the computer program comprising instructions which, when executed by a computer, perform the steps of:

receiving identification information from the wireless device through a wireless communications network, wherein the identification information corresponds to a peripheral device in communication with the wireless device;

retrieving a driver from a database based on the identification information received;

transmitting the driver to the wireless device via the wireless communications network; and transmitting, based on the sent identification information, at least one of an application menu and an application to the wireless device via the wireless communications network, wherein the application menu comprises an indication of an available application corresponding to the identification information, and wherein the application corresponds to the identification information.

44. The computer program of claim 43, further performing the steps of:

receiving an application menu request from the wireless device;

compiling the application menu based on the identification information and the application menu request; and transmitting the application menu to the wireless device.

45. The computer program of claim 43, further performing the steps of:

receiving an application request from the wireless device;

retrieving the application from the database and the application request; and transmitting the application to the wireless device.

46. The computer program of claim 43, further performing the steps of:

receiving a password from the wireless device prior to the transmitting of at least one of the application menu and the application to the wireless device; and verifying the password as a precondition to initiating the transmitting of at least one of the application menu and the application to the wireless device.

47. The computer program of claim 43, further performing the steps of:

receiving subscriber information from the wireless device prior to the transmitting of at least one of the application menu and the application to the wireless device; and verifying the subscriber information against a subscriber database as a precondition to initiating the transmitting of at least one of the application menu and the application to the wireless device.

48. An apparatus capable of communicating with a peripheral device, the apparatus being capable of automatically detecting the peripheral device and downloading a driver for the peripheral device through a wireless communications network, comprising:

an external interface means;

a controller means capable of detecting a peripheral device communicating with the external interface means, the controller means being capable of retrieving peripheral device information from the peripheral device;

a transceiver means for transmitting the peripheral device information to a remote server via the wireless communications network, the transceiver means being capable of receiving a driver for the peripheral device from the remote sewer, and the transceiver means further capable of receiving at least one of an application menu and an application based on the transmitted peripheral device information, wherein the application menu comprises an indication of an available application corresponding to the peripheral device information, and wherein the application corresponds to the peripheral device information; and a storage means for storing the driver received from the remote server;

wherein the driver is used for the controller means to communicate with the peripheral device.

49. The apparatus of claim 48, farther comprising:

an user interface means for receiving user inputs; and a display means for displaying information to a user of the apparatus.

50. The apparatus of claim 48, farther comprising a peripheral interface means capable of receiving the peripheral device in communication with the external interface means.

51. The apparatus of claim 48, wherein the peripheral device comprises a USB capable device.

52. The apparatus of claim 48, wherein the peripheral device comprises a Compact Flash (CF) capable device.

53. The apparatus of claim 48, wherein the peripheral device comprises a PC Card capable device.

54. The apparatus of claim 48, wherein the peripheral device comprises a Secure Digital capable device.

55. The apparatus of claim 48, wherein the controller means further being capable of retrieving driver information corresponding to the peripheral device from the peripheral device and directing the transceiver means to transmit the driver information to the remote server.

56. The apparatus of claim 48, wherein the external interface means further is capable of communicating with a peripheral device not physically attached to the peripheral interfacing means.

57. The apparatus of claim 56, wherein the external interface means communicates with the peripheral device through wireless communication.

58. The apparatus of claim 56, wherein the external interface means communicates with the peripheral device through wired communication.

* * * * *